United States Patent [19]

Bose et al.

[11] Patent Number: 4,508,257

[45] Date of Patent: Apr. 2, 1985

[54] METHOD OF BRAZING WITH NICKEL BASED ALLOY

[75] Inventors: Debasis Bose, Randolph; Amitava Datta, Morris Township, Morris County; Nicholas J. DeCristofaro, Chatham, all of N.J.

[73] Assignee: Allied Corporation, Morris Township, Morris County, N.J.

[21] Appl. No.: 587,324

[22] Filed: Mar. 7, 1984

Related U.S. Application Data

[62] Division of Ser. No. 470,403, Feb. 28, 1983, Pat. No. 4,448,618.

[51] Int. Cl.³ .................... B23K 35/30; B23K 35/14
[52] U.S. Cl. .................... 228/263.13; 228/263.15; 164/463
[58] Field of Search .................... 228/263.11, 263.13, 228/263.14, 263.15; 164/463

[56] References Cited

U.S. PATENT DOCUMENTS

| | | | |
|---|---|---|---|
| 3,070,875 | 1/1963 | Feduska | 29/194 |
| 3,856,513 | 12/1974 | Chen et al. | 148/403 |
| 4,148,973 | 4/1979 | Sexton et al. | 228/263.11 |
| 4,149,881 | 4/1979 | D'Silva | 75/134 |
| 4,169,744 | 10/1979 | D'Silva | 148/32 |
| 4,169,749 | 10/1979 | De Silva | 148/32 |

FOREIGN PATENT DOCUMENTS 53-082638  7/1978  Japan .

OTHER PUBLICATIONS

Japanese Patent Gazette, Oct. 1978, week A34, Abstract No. 61322.
Scripta Metallurgica, vol. 9, No. 7, 1975, pp. 787–789.
Welding Journal, vol. 57, No. 7, Jul. 1978, pp. 33–38.
Welding Journal, vol. 55, No. 10, Oct. 1976, pp. 285–292.

Primary Examiner—Kenneth J. Ramsey
Attorney, Agent, or Firm—Ernest D. Buff; Gerhard H. Fuchs

[57] ABSTRACT

A nickel based metal alloy consists essentially of about 25 to 35 atom percent palladium and about 15 to 20 atom percent silicon the balance being essentially nickel and incidental impurities. The alloy is especially suited for use as a filler metal in joining steels and superalloys at temperatures less than 1000° C.

7 Claims, 2 Drawing Figures

Photomicrograph of AISI 316 stainless steel joint brazed with Sample No. 1 alloy of the present invention (Magnification 400 X).

Photomicrograph of AISI 316 stainless steel joint brazed with Sample No. 1 alloy of the present invention (Magnification 400 X).

Photomicrograph of AISI 316 stainless steel joint brazed with Sample No. 2 alloy of the present invention (Magnification 400 X).

METHOD OF BRAZING WITH NICKEL BASED ALLOY

This application is a division of application Ser. No. 470,403, filed Feb. 28, 1983, now U.S. Pat. No. 4,448,618.

BACKGROUND OF THE INVENTION

1. Field of the Invention

This invention relates to the development of nickel based, boron-free, metal brazing alloys having liquidus temperatures in the range of 877°–948° C. (1611°–1738° F.).

2. Description of the Prior Art

Brazing is a process for joining metal parts, often of dissimilar composition, to each other. Typically, a filler metal that has a melting point lower than that of the base metal parts to be joined together is interposed between the metal parts to form an assembly. The assembly is then heated to a temperature sufficient to melt the filler metal. Upon cooling, a strong, corrosion resistant, leak-tight joint is formed.

Certain steels and superalloys used in construction of nuclear reactor components require brazing filler metals capable of providing high joint strengths. In these applications, the filler metals cannot contain boron, due to the boron atom's relatively high cross section for neutron absorption with consequent reduction in reactor efficiency. It has therefore been proposed that nickel based filler metals containing silicon or phosphorous as melting point depressors, be used in such applications. The brazing temperatures of the silicon containing filler metals are extremely high. A typical silicon containing filler metal having the American Welding Society designation (AWS) BNi-5 has a brazing temperature of about 1149°–1204° C. (2100°–2200° F.). Exposure to temperatures of this magnitude during brazing deteriorates the mechanical properties of many steels and superalloys, rendering them unsuitable for use in construction of nuclear reactor components. The brazing temperatures of phosphorous containing filler metals are somewhat lower than their silicon containing counterparts. For example, the brazing temperatures of phosphorous containing filler metals designated AWS BNi-6 and BNi-7 are about 927°–1093° C. (1700°–2000° F.). However, the phosphorous containing filler metals produce brittle joints which exhibit poor joint strengths.

Therefore, there remains a need in the art for a nickel based brazing alloy that is free of boron and phosphorous and is adapted for brazing at temperatures less than 1000° C.

SUMMARY OF THE INVENTION

The present invention provides a metal alloy which is especially suited for joining steels and superalloys at temperatures less than 1000° C., and which contains neither boron nor phosphorous as a melting point depressor. Generally stated, the alloy has a composition consisting essentially of about 25–35 atom percent palladium and about 15 to 20 atom percent silicon, the balance being nickel and incidental impurities. Preferably, the alloy is composed of metastable material having at least 50 percent glassy structure.

In addition, the invention provides a brazing filler metal in powder or foil form. The foil is homogeneous and ductile and, like the powder, has a composition consisting essentially of 25 to 35 atom percent palladium and 15 to 25 atom percent silicon, the balance being nickel and incidental impurities.

The homogeneous brazing foil of the invention is fabricated by a process which comprises forming a melt of the composition and quenching the melt on a rotating quench wheel at a rate of at least about $10^{5°}$ C./sec. Rapid quenching of the alloys is facilitated by the presence therein of substantial amounts of silicon (contained in the sollid state as hard, brittle silicides).

Further, there is provided in accordance with the invention, an improved process for joining two or more metal parts by brazing. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly. The improvement comprises employing, as the filler metal, a homogeneous, nickel based foil that has the composition given above.

The filler metal foil is easily fabricable as homogeneous, ductile ribbon, which is useful for brazing as cast. Foil produced in this manner is preferably composed of metastable material having at least 50% glassy structure with a thickness of less than 100 μm (0.004"). Other methods, such as (1) rolling (2) casting or (3) powder metallurgical techniques can be applied to fabricate these alloys to a foil form. It has been found that use of a thin flexible and homogeneous foil, is beneficial for joining wide areas with narrow clearances. Advantageously, the nickel based metal foil can be stamped into complex shapes to provide braze preforms. The alloys of the invention can also be produced in powder form by atomization of the alloy or mechanical comminution of a foil composed thereof.

Advantageously, the homogeneous, ductile brazing foil of the invention can be placed inside the joint prior to the brazing operation. Use of the homogeneous, ductile nickel based foil provided by this invention also permits brazing to be accomplished by processes such as dip brazing in molten salts, which are not readily accomplished with powder or rod-type fillers.

BRIEF DESCRIPTION OF THE DRAWINGS

The invention will be more fully understood and further advantages will become apparent when reference is made to the following detailed description and the accompanying drawings in which.

DETAILED DESCRIPTION OF THE INVENTION

Figure 1:
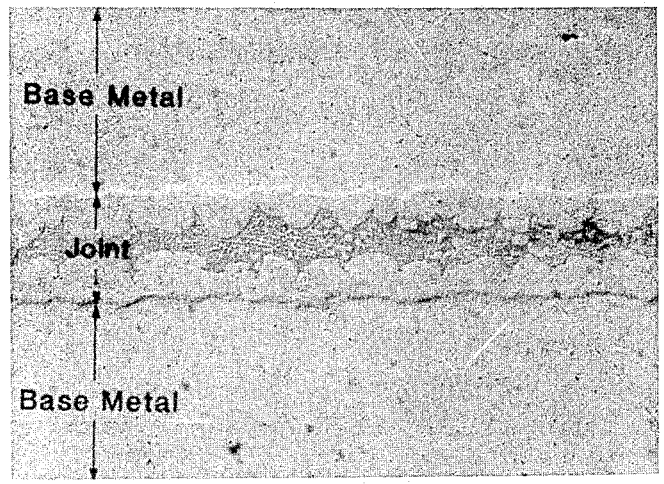
FIG. 1 is a photomicrograph showing a joint brazed with a brazing foil of the present invention.

In any brazing process, the brazing material must have a melting point that will be sufficiently high to provide strength to meet service requirements of the metal parts brazed together. However, the melting point must not be so high as to make difficult the brazing operation. Further, the filler material must be compatible, both chemically and metallurgically, with the materials being brazed. The brazing material must be more noble than the metal being brazed to avoid corrosion. Ideally, the brazing material must be in ductile foil form so that complex shapes may be stamped therefrom. Finally, the brazing foil should be homogeneous, that is, contain no binders or other materials that would otherwise form voids or contaminating residues during brazing.

In accordance with the invention a brazing filler metal is provided. The filler metal has a composition consisting essentially of about 25-35 atom percent palladium, about 15 to 20 atom percent silicon, balance being nickel and incidental impurities. These compositions are compatible with steels and superalloys and are particularly suited for joining these materials. Preferably, the filler metal has the form of a homogeneous, ductile brazing foil.

By homogeneous is meant that the foil, as produced, is of substantially uniform composition in all dimensions. By ductile is meant that foil can be bent to a round radius as small as ten times the foil thickness without fracture.

Examples of brazing alloy compositions within the scope of the invention are set forth in Table I:

TABLE I

| Sample No. | Composition | | |
|---|---|---|---|
| | Ni | Pd | Si |
| 1 (wt %) | 47.2 | 46.7 | 6.1 |
| (at %) | 55 | 30 | 15 |
| 2 (wt %) | 43.9 | 47.7 | 8.4 |
| (at %) | 50 | 30 | 20 |
| 3 (wt %) | 50.0 | 41.2 | 8.8 |
| (at %) | 55 | 25 | 20 |
| 4 (wt %) | 38.1 | 53.8 | 8.1 |
| (at %) | 45 | 35 | 20 |

Silicon is added to depress the melting temperature of nickel; palladium is added to depress the melting temperature and to provide corrosion resistance of the joint.

Further, in accordance with the invention, an improved process for joining two or more metal parts is disclosed. The process comprises:

(a) interposing a filler metal between the metal parts to form an assembly, the filler metal having a melting temperature less than that of any of the metal parts;

(b) heating the assembly to at least the melting temperature of the filler metal; and (c) cooling the assembly. The improvement comprises employing, as the filler metal, at least one homogeneous, nickel based foil having a composition within the ranges given above.

The alloys of the present invention can be produced in various forms, including powder, foil or sheet by application of various rapid solidification and comminution techniques. One method commonly used to fabricate these alloys into powder form involves gas or water atomization of molten alloys. Other techniques, widely used in the industry, are described in the following documents.

The alloys of the present invention can also be produced in the form of a thin flexible foil by application of rapid solidification processes. Such rapid solidification yields continuous ribbon, wire, sheet, etc. Typically, a particular composition is selected, powders or granules of the requisite elements in the desired portions are melted and homogenized, and the molten alloy is rapidly quenched on a chill surface, such as rapidly rotating metal cylinder.

Under these quenching conditions, a metastable, homogeneous, ductile material is obtained. The metastable material may be glassy, in which case there is no long range order. X-ray diffraction patterns of glassy metal alloys show only a diffuse halo, similar to that observed for inorganic oxide glasses. Such glassy alloys must be at least 50% glassy to be sufficiently ductile to permit subsequent handling, such as stamping complex shapes from ribbons of the alloys. Preferably, the glassy metal alloys must be at least 80% glassy, and most preferably substantially (or totally) glassy, to attain superior ductility.

The metastable phase may also be a solid solution of the constituent elements. In the case of the alloys of the invention, such metastable, solid solution phases are not ordinarily produced under conventional processing techniques employed in the art of fabricating crystalline alloys. X-ray diffraction patterns of the solid solution alloys show the sharp diffraction peaks characteristic of crystalline alloys, with some broadening of the peaks due to desired fine-grained size of crystallites. Such metastable materials are also ductile when produced under the conditions described above.

The brazing material of the invention is advantageously produced in foil (or ribbon) form, and may be used in brazing applications as cast, whether the material is glassy or a solid solution. Alternatively, foils of glassy metal alloys may be heat treated to obtain a crystalline phase, preferably fine-grained, in order to promote longer die life when stamping of complex shapes is contemplated.

Foils as produced by the processing described above typically are about 0.0005 to 0.004 inch (12 to 100 microns) thick, which is also the desired spacing between bodies being brazed. Such spacing maximizes the strength of the braze joint. Thinner foils stacked to form greater thicknesses may also be employed. Further, no fluxes are required during brazing, and no binders are present in the foil. Thus, formation of voids and contaminating residues is eliminated. Consequently, the ductile brazing ribbons of the invention provide both ease of brazing, by eliminating the need for spacers, and minimal post-brazing treatment.

The brazing foils of the invention are also superior to various powder brazes of the same composition in providing good braze joints. This is probably due to the ability to apply the brazing foil where the braze is required, rather than depending on capillarity to transport braze filler metal from the edge of surfaces to be brazed.

EXAMPLE 1

Ribbons of about 2.54 to 25.4 mm (about 0.10 to 1.00 inch) wide and about 13 to 76 μm (about 0.0005 to 0.003 inch) thick were formed by aquirting a melt of the particular composition by overpressure of argon onto a rapidly rotating copper chill wheel (surface speed about 3000 to 6000 ft/min). Metastable homogeneous ribbons of substantially glassy alloys having the compositions set forth in Table I were produced.

EXAMPLE 2

The liquidus and solidus temperatures of the ribbons mentioned in Example 1 were determined by Differential Thermal Analysis (DTA) Technique. The individual samples were heated side by side with an inert reference material at a uniform rate and the temperature difference between them was measured as a function of temperature. The resulting curve, known as a thermogram, was a plot of heat-energy change vs. temperature, from which the beginning of melting and end of melting, known respectively as solidus and liquidus temperatures, were determined. Values thus determined are set forth in Table II below.

TABLE II

| Sample No. | Composition (at %) | Liquidus °C. (°F.) | Solidus °C. (°F.) |
| --- | --- | --- | --- |
| 1 | $Ni_{55}Pd_{30}Si_{15}$ | 852 (1566) | 810 (1490) |
| 2 | $Ni_{50}Pd_{30}Si_{20}$ | 895 (1643) | 841 (1546) |
| 3 | $Ni_{55}Pd_{25}Si_{20}$ | 923 (1693) | 716 (1321) |
| 4 | $Ni_{45}Pd_{35}Si_{20}$ | 868 (1594) | 830 (1526) |

EXAMPLE 3

Test blanks having length×width×thickness measuring 2.54 cm×1.27 cm×0.159 cm (1"×0.5"×0.0625") were cut from AISI type 316 stainless steel. A brazing alloy of the present invention, a glassy, ductile ribbon of nominal composition of the Sample No. 1 as provided in Table I, and having thickness and width dimensions measuring about 0.025 mm (0.001") by 6.35 mm (0.25") was used to braze the test specimens. The test blanks and the braze foils were degreased in acetone and rinsed with alcohol. Two layers of foil of the present invention were placed between two test blanks to form a sandwich assembly. The samples were then tack welded by gas tungsten arc welding to hold the assembly together. Samples were then brazed in a vacuum furnace at a vacuum of about $13.4 \times 10^{-3}$ Pa ($10^{-4}$ torr) at 910° C. (1674° F.) for 5 minutes. The brazed samples were then cross-sectioned, mounted and polished for metallographic inspection. A photomicrograph of a joint cross-section brazed with Sample No. 1 is illustrated in FIG. 1 at a magnification of 400×. The photomicrograph shown in FIG. 1 demonstrates that a sound, void-free joint was obtained.

EXAMPLE 4

Figure 2:
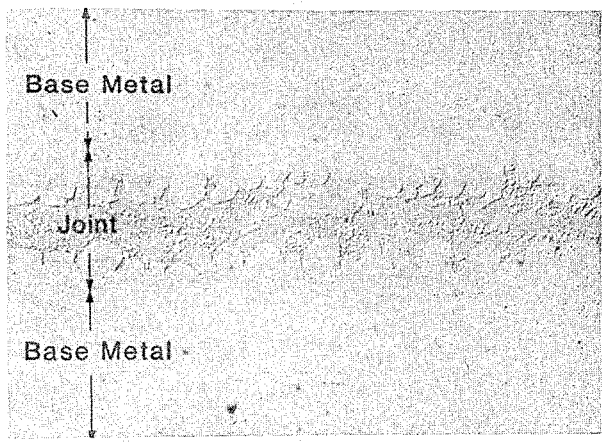
FIG. 2 is a photomicrograph showing a joint brazed with another brazing foil of the present invention.

Test blanks having length×width×thickness dimensions measuring 2.54 cm×1.27 cm×0.159 cm (1"×0.5"×0.0625") were cut from AISI type 316 stainless steel. A brazing alloy of the present invention, a glassy, ductile ribbon of nominal composition of the Sample No. 2 as provided in Table I, and having thickness and width dimensions measuring about 0.03 mm (0.0012") by 1.27 cm (0.5 inch) was used to braze the test specimens. The test blanks and the braze foils were degreased in acetone and rinsed with alcohol. Two layers of foil of the present invention were placed between two test blanks to form a sandwich assembly. The samples were then tack welded by gas tungsten arc welding to hold the assembly together. Samples were then brazed in a vacuum furnace at a vacuum of about $13.4 \times 10^{-3}$ Pa ($10^{-4}$ torr) at 950° C. (1742° F.) for 5 minutes. The brazed samples were then cross-sectioned, mounted and polished for metallographic inspection. A photomicrograph of a joint cross-section brazed with Sample No. 2 is illustrated in FIG. 2 at a magnification of 400×. The photomicrograph shown in FIG. 2 demonstrates that a sound, void-free joint was obtained.

Having thus described the invention in rather full detail, it will be understood that such detail need not be strictly adhered to but that various changes and modifications may suggest themselves to one skilled in the art, all falling within the scope of the present invention as defined by the subjoined claims.

What is claimed is:

1. A process for fabricating homogeneous ductile foil having a composition consisting essentially of 25 to 35 atom percent palladium and 15 to 20 atom percent silicon, the balance being nickel and incidental impurities, which process comprises forming a melt of the composition and quenching the melt on a moving chill surface at a rate of at least about $10^5$ °C./sec.

2. The process of claim 1 in which said foil has a thickness ranging from 0.0005 to 0.004 inch (12 to 100 microns).

3. A product produced by the process of claim 1.

4. A process for joining together two or more metal parts which comprises:
   (a) interposing a filler metal between the metal parts to form an assembly, the filler metal having a melting point less than that of any of the parts;
   (b) heating the assembly to at least the melting temperature of the filler metal; and
   (c) cooling the assembly; wherein the improvement comprises employing, as the filler metal, a homogeneous nickel based foil having a composition consisting essentially of 25 to 35 atom percent palladium and 15 to 20 atom percent silicon, the balance being nickel and incidental impurities.

5. The process of claim 4, in which the filler metal foil has at least about 50% glassy structure.

6. The process of claim 4 in which the filler metal foil is ductile has at least 90% glassy structure.

7. The process of claim 4 in which the total thickness of the foil ranges from 0.0005 to 0.004 inch (12 to 100 microns).

* * * * *